United States Patent
Glöckler et al.

(10) Patent No.: US 8,246,073 B2
(45) Date of Patent: Aug. 21, 2012

(54) AIRBAG ARRANGEMENT FOR A VEHICLE OCCUPANT RESTRAINT SYSTEM

(75) Inventors: Oliver Glöckler, Nersingen (DE); Peter Baumgartner, Günzburg (DE)

(73) Assignee: Takata AG, Aschaffenburg (DE)

( * ) Notice: Subject to any disclaimer, the term of this patent is extended or adjusted under 35 U.S.C. 154(b) by 40 days.

(21) Appl. No.: 12/585,300

(22) Filed: Sep. 10, 2009

(65) Prior Publication Data

US 2010/0045004 A1 Feb. 25, 2010

Related U.S. Application Data

(63) Continuation of application No. PCT/EP2008/052857, filed on Mar. 11, 2008.

(30) Foreign Application Priority Data

Mar. 12, 2007 (DE) ...................... 20 2007 003 906 U

(51) Int. Cl.
*B60R 21/16* (2006.01)
*B60R 21/20* (2011.01)
*B60R 21/201* (2011.01)
*B60R 21/217* (2011.01)
*B60R 21/26* (2011.01)

(52) U.S. Cl. .................................................. 280/728.2
(58) Field of Classification Search ............... 280/728.2, 280/741
See application file for complete search history.

(56) References Cited

U.S. PATENT DOCUMENTS

| | | | |
|---|---|---|---|
| 3,767,225 A | 10/1973 | Mazelsky | |
| 5,096,222 A | 3/1992 | Komerska et al. | |
| 5,669,627 A * | 9/1997 | Marjanski et al. | 280/728.3 |
| 5,803,485 A * | 9/1998 | Acker et al. | 280/728.2 |
| 5,857,696 A * | 1/1999 | Inoue et al. | 280/728.2 |
| 6,860,506 B2 * | 3/2005 | Ogata et al. | 280/730.2 |
| 7,597,343 B2 * | 10/2009 | Miwa et al. | 280/728.2 |
| 7,780,188 B2 * | 8/2010 | Eckert et al. | 280/728.2 |
| 7,900,954 B2 * | 3/2011 | Sahm | 280/728.2 |
| 2002/0135160 A1 | 9/2002 | Lorenz | |

(Continued)

FOREIGN PATENT DOCUMENTS

DE         91 01 099 U1      7/1992

(Continued)

OTHER PUBLICATIONS

Communication in EP Appln No. 08 717 604.6 dated Feb. 2, 2011.

*Primary Examiner* — Paul N Dickson
*Assistant Examiner* — Joselynn Y Sliteris
(74) *Attorney, Agent, or Firm* — Foley & Lardner LLP

(57) ABSTRACT

An airbag arrangement for a vehicle occupant restraint system is provided. The airbag arrangement comprising an airbag folded into an airbag package, a cover that may be evacuated and encloses the airbag package, a gas generator for inflating the airbag, a receptacle formed by a section of the cover enclosing the airbag package and in which at least one section of the gas generator is housed. The airbag comprising an opening, which forms an inlet to an inflatable area of the airbag and in which the receptacle is arranged at least sectionally or into which the receptacle projects. The gas generator is formed as a tubular gas generator. The opening has a hollow cylindrical area in which the receptacle is arranged, or the opening is formed as a hole in an airbag layer which forms a chamber of the airbag.

12 Claims, 25 Drawing Sheets

U.S. PATENT DOCUMENTS

| | | |
|---|---|---|
| 2004/0061316 A1 | 4/2004 | Elqadah et al. |
| 2006/0071456 A1 | 4/2006 | Jenkins et al. |
| 2007/0046082 A1 | 3/2007 | Yoshikawa |
| 2007/0108752 A1 | 5/2007 | Eckert et al. |
| 2008/0111351 A1 | 5/2008 | Eckert et al. |
| 2008/0258446 A1 | 10/2008 | Eckert et al. |
| 2009/0121457 A1 * | 5/2009 | Yoshikawa et al. ........ 280/728.2 |

FOREIGN PATENT DOCUMENTS

| | | |
|---|---|---|
| DE | 101 14 208 A1 | 5/2002 |
| DE | 20 2005 009 002 U1 | 9/2005 |
| DE | 20 2005 010 864 U1 | 10/2005 |
| DE | 20 2005 011 878 U1 | 11/2005 |
| DE | 10 2004 056 128 A1 | 1/2007 |
| EP | 0 812 736 A1 | 12/1997 |
| EP | 1 798 119 A1 | 6/2007 |
| EP | 2 043 892 | 4/2009 |
| JP | 04 146840 A | 5/1992 |
| WO | WO-2006050719 A1 * | 5/2006 |
| WO | WO-2007009416 A1 * | 1/2007 |
| WO | WO-2008/012156 | 1/2008 |

* cited by examiner

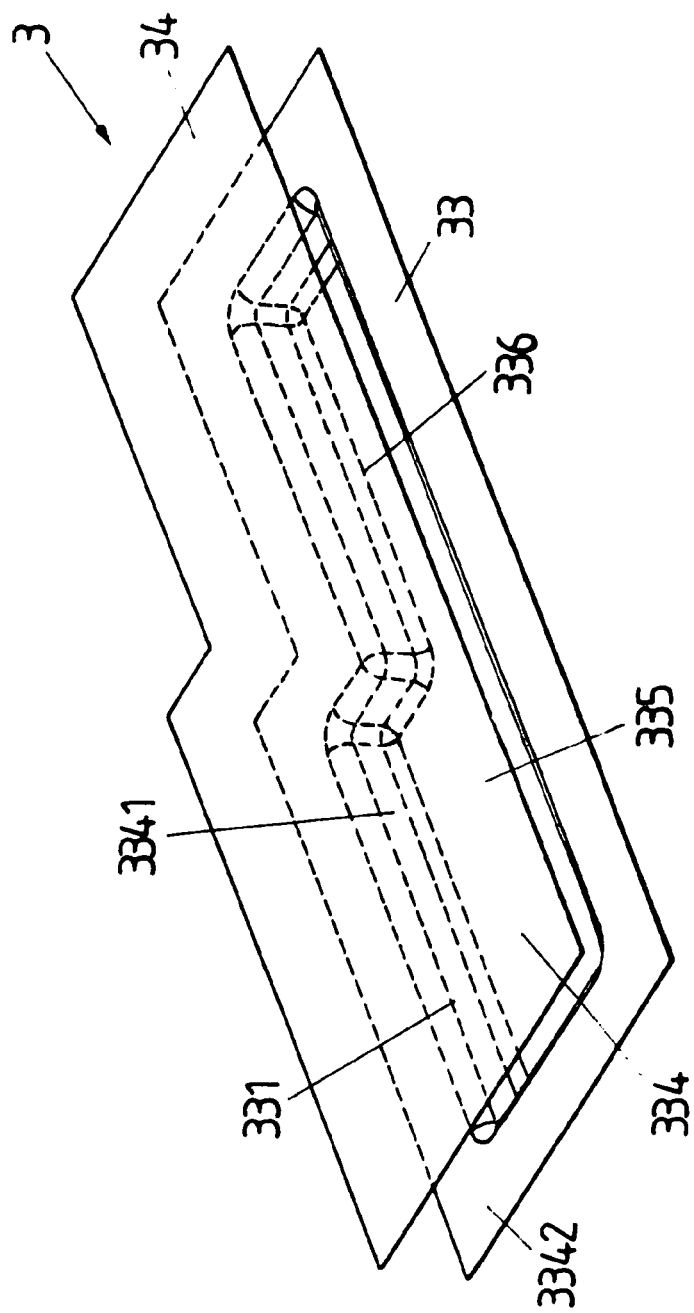

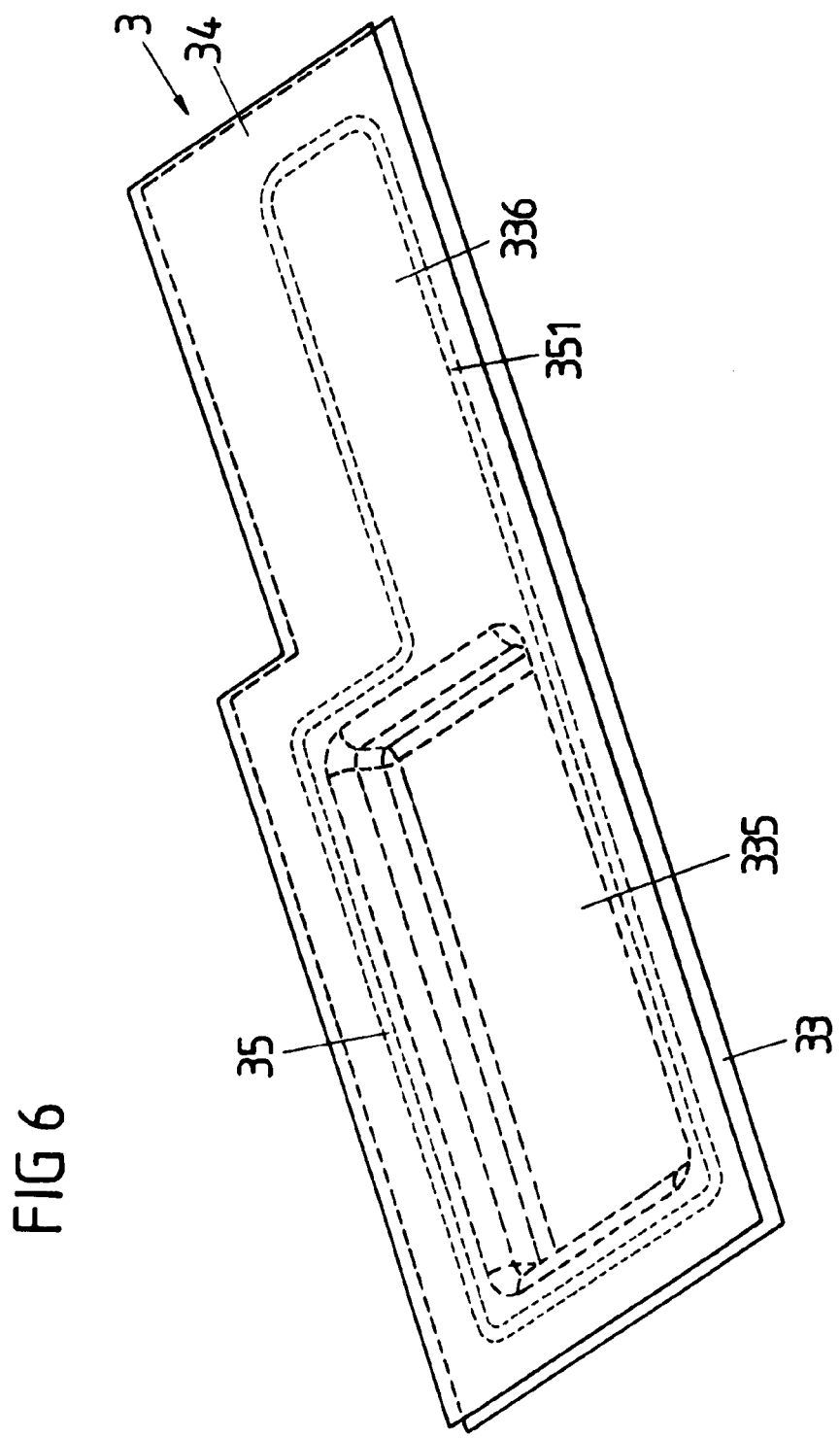

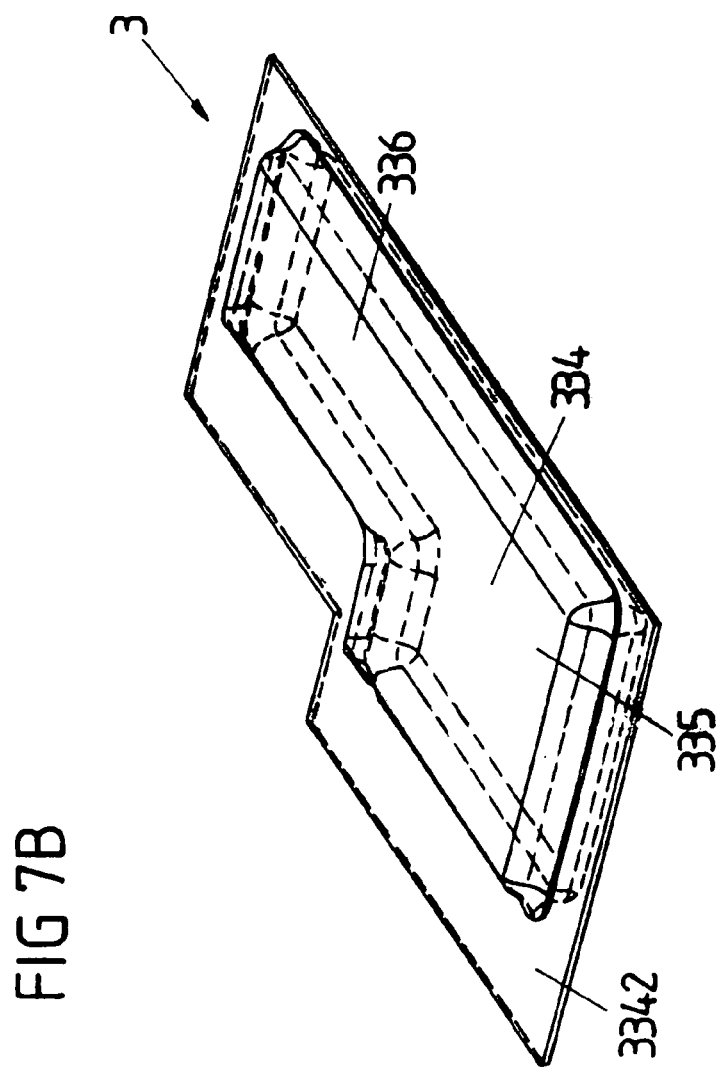

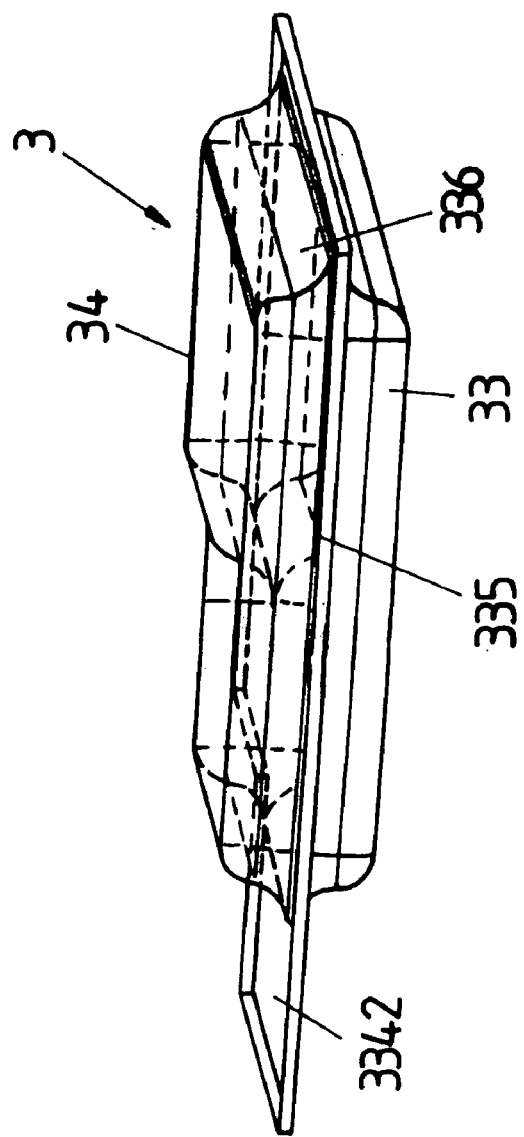

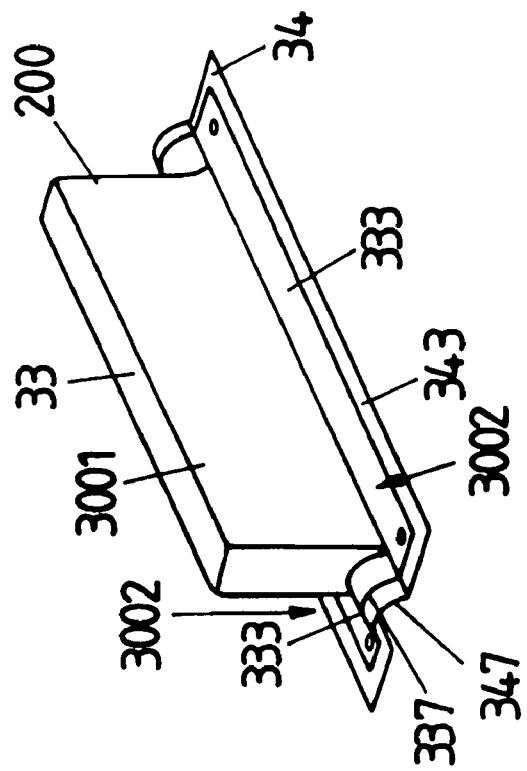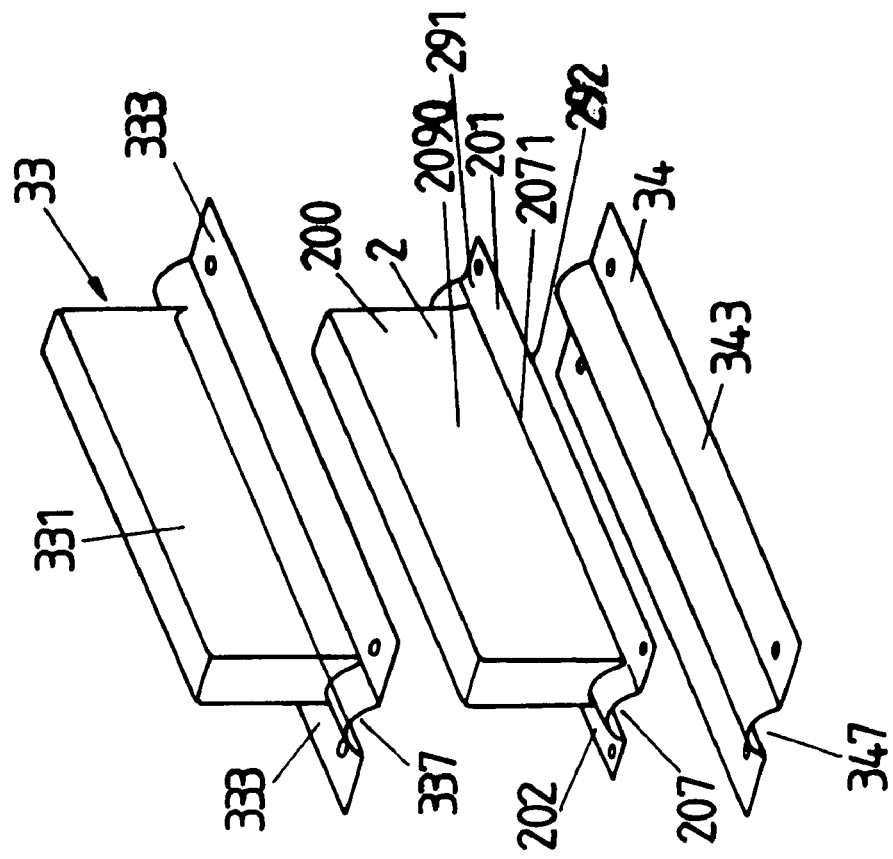

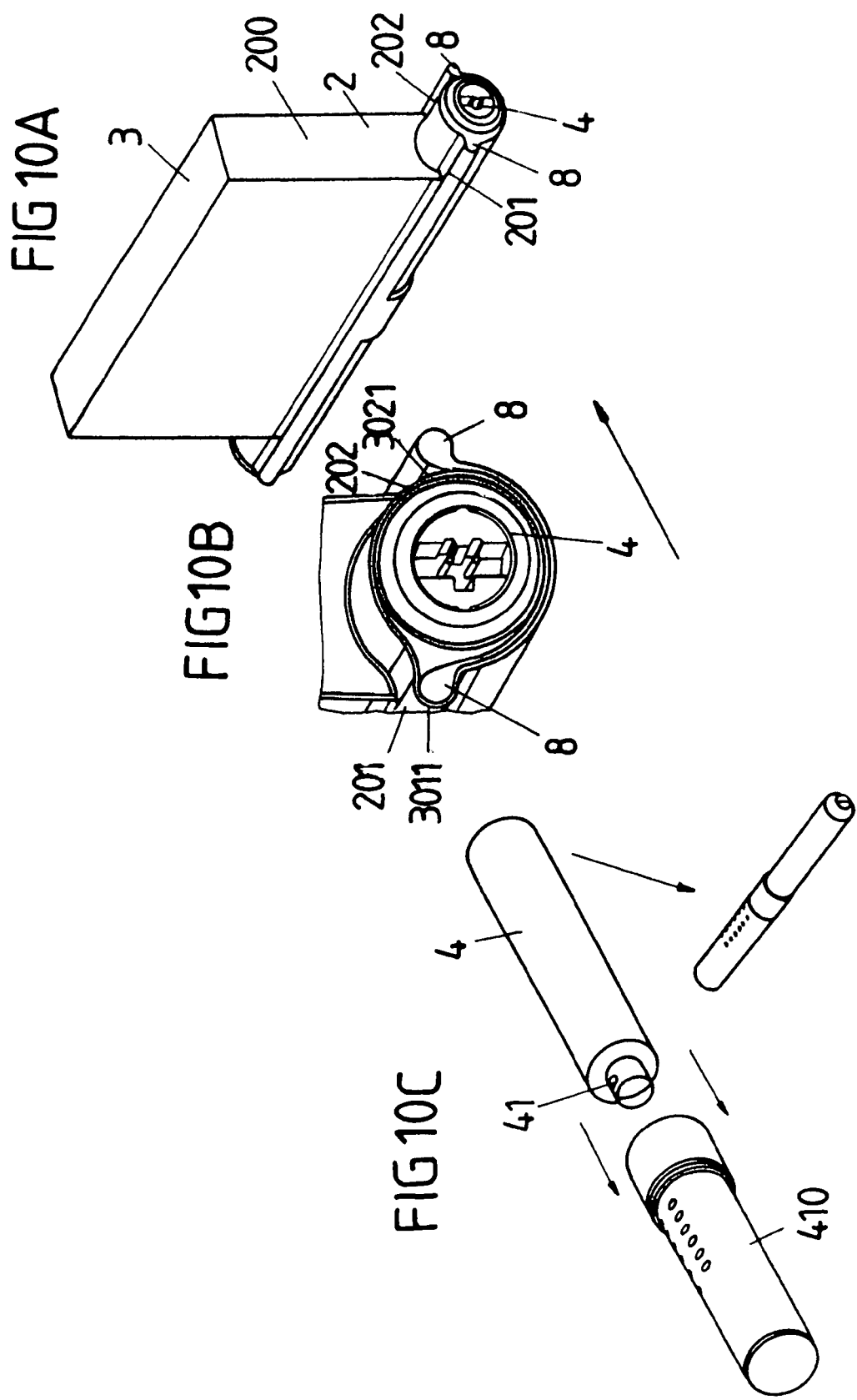

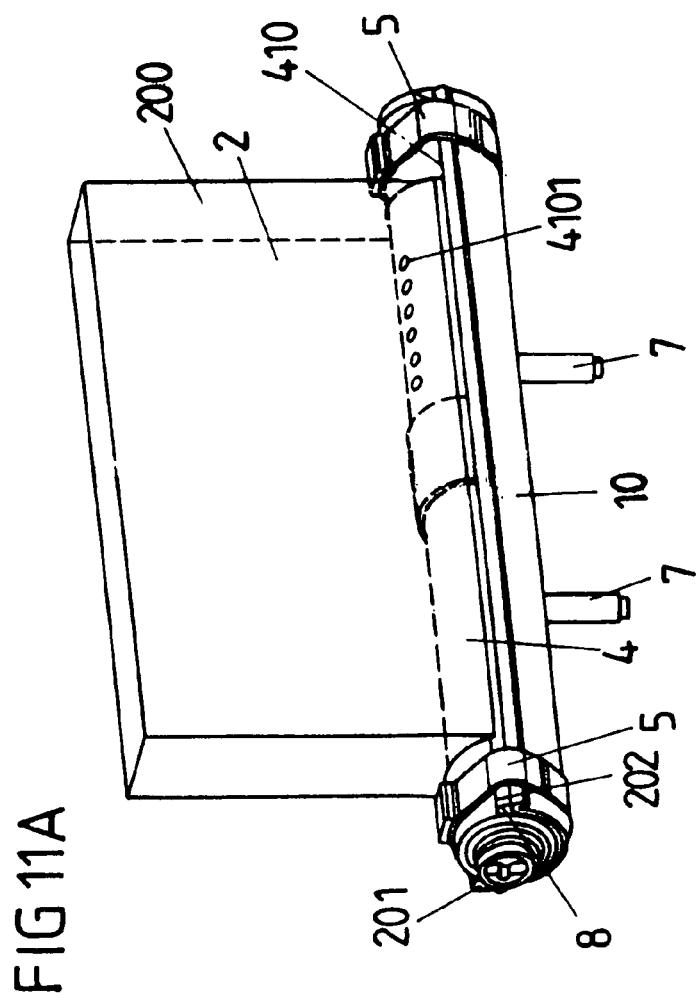

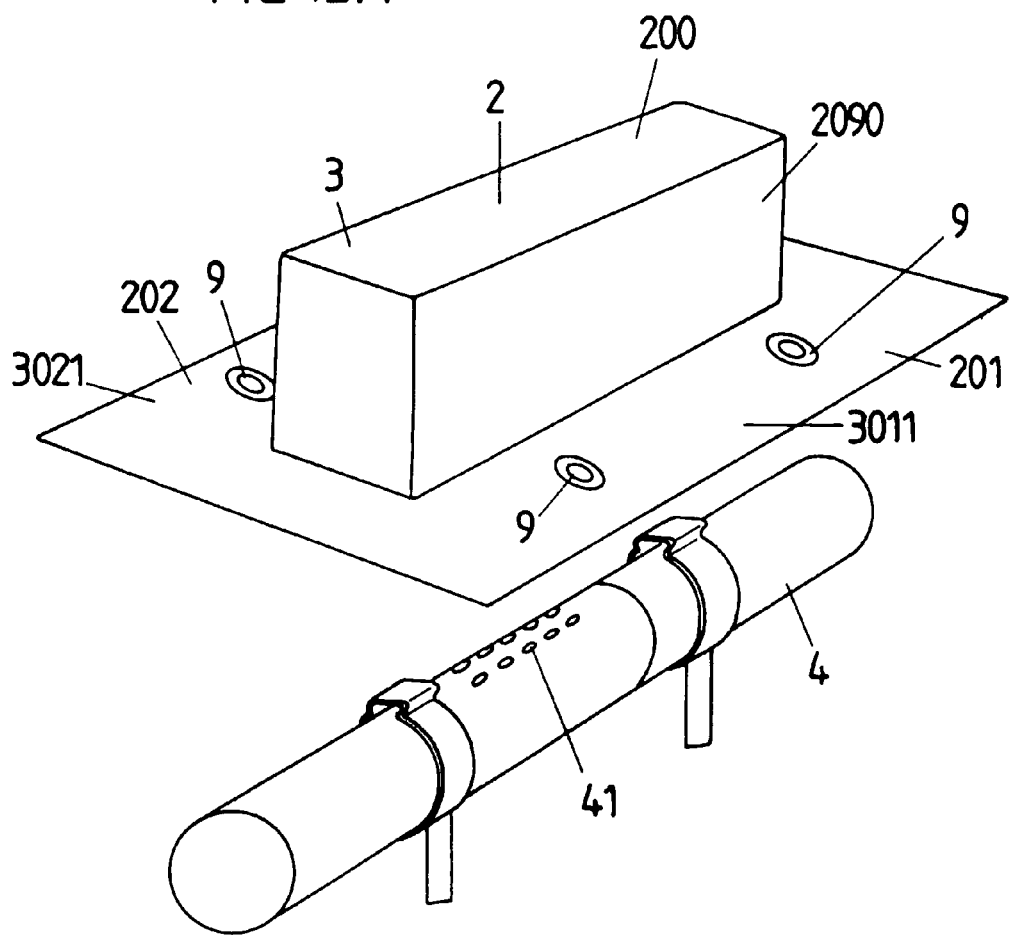

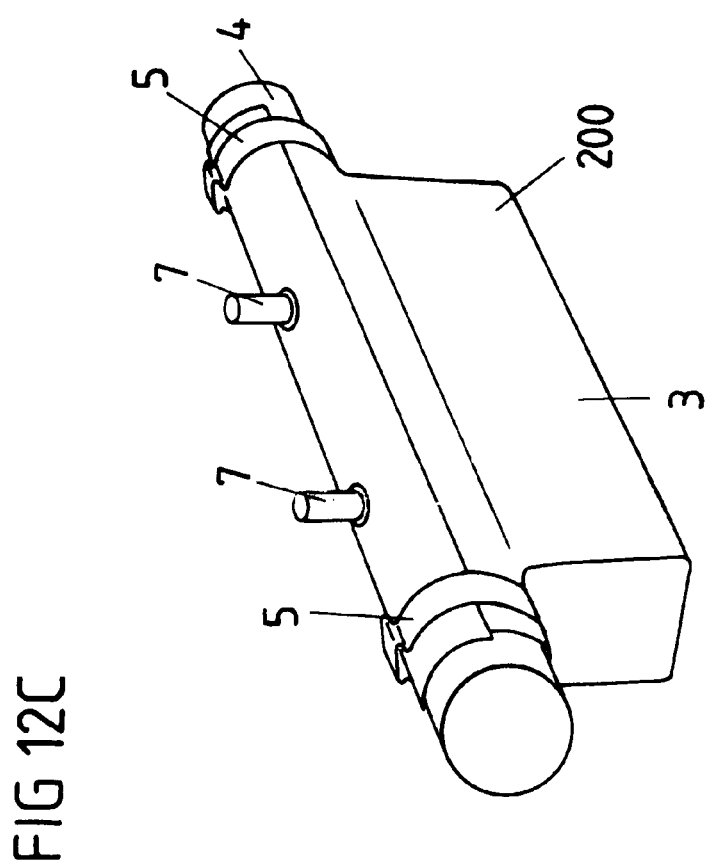

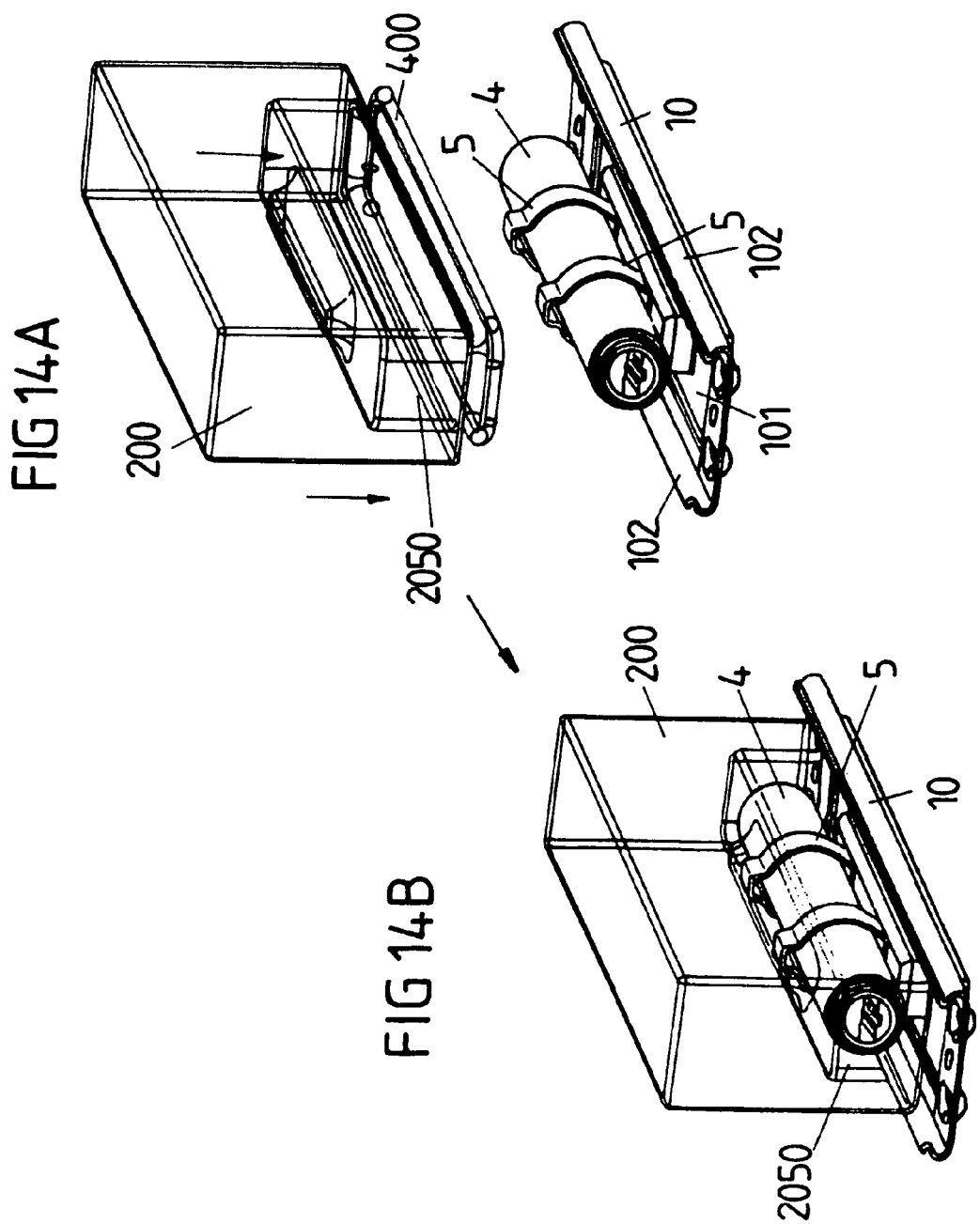

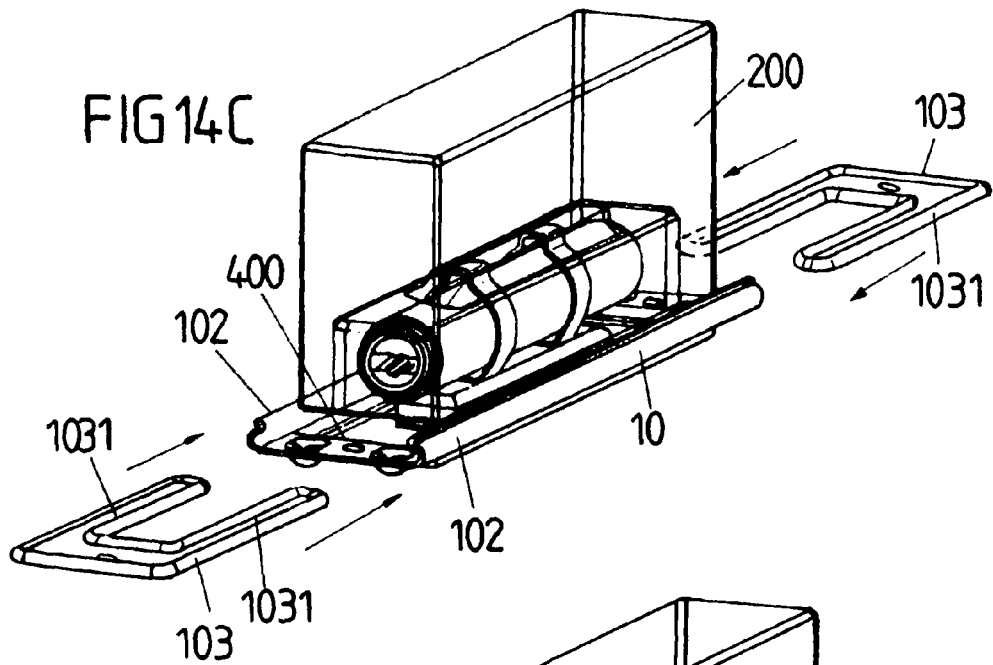
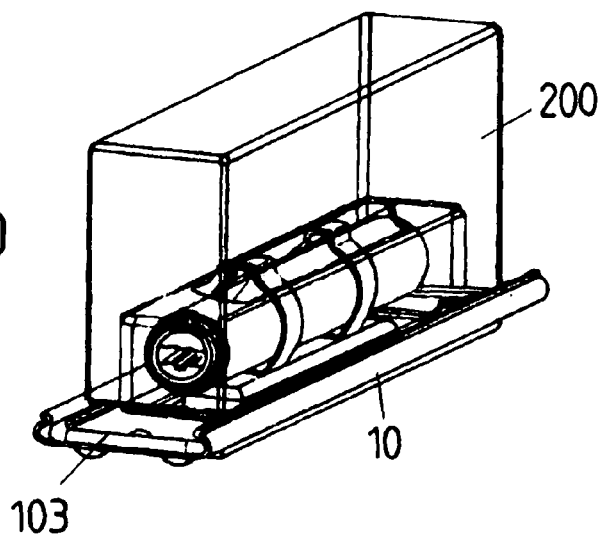
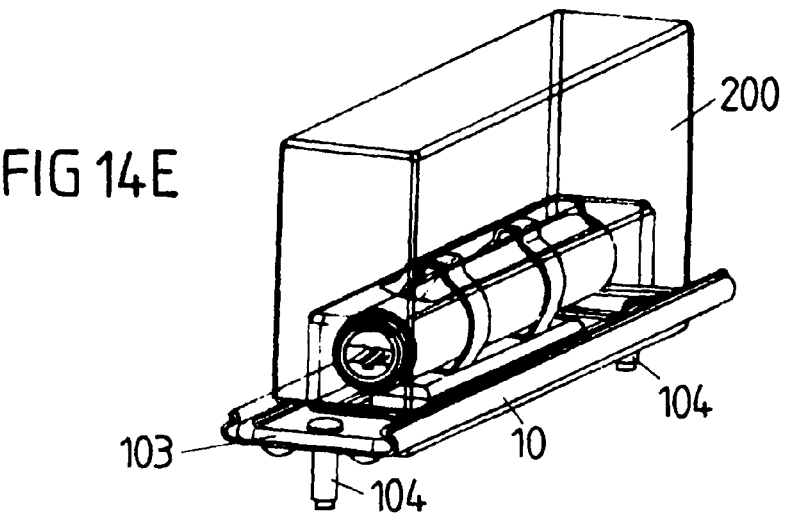

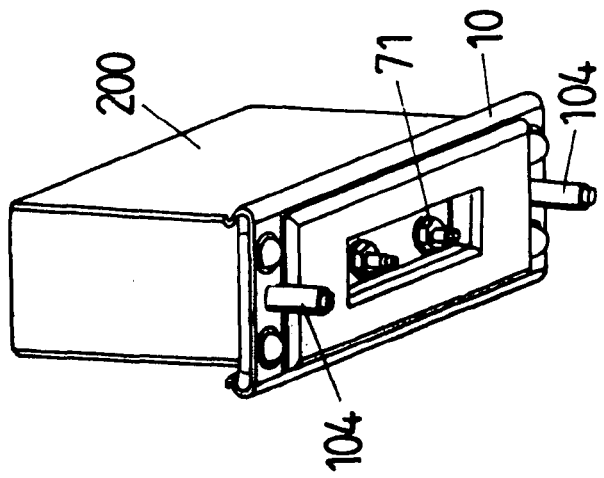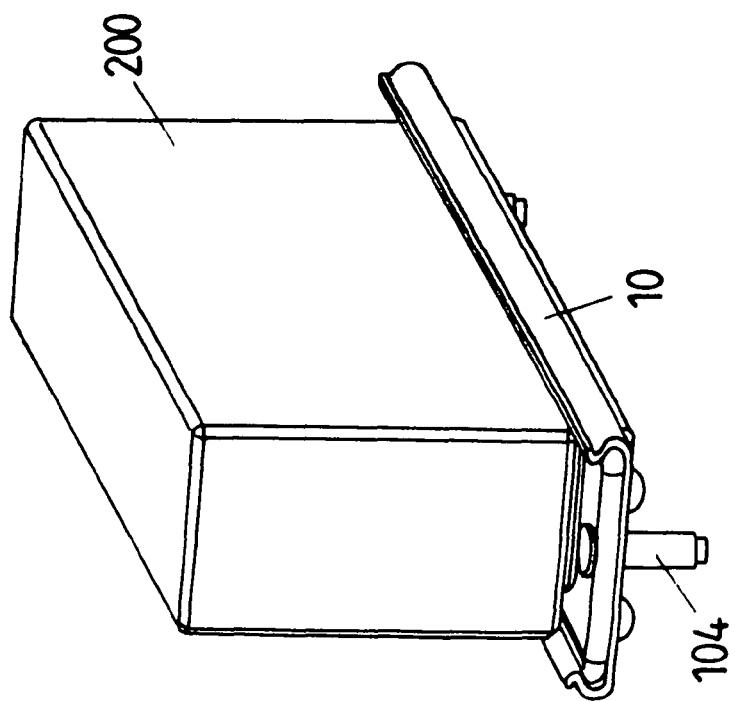

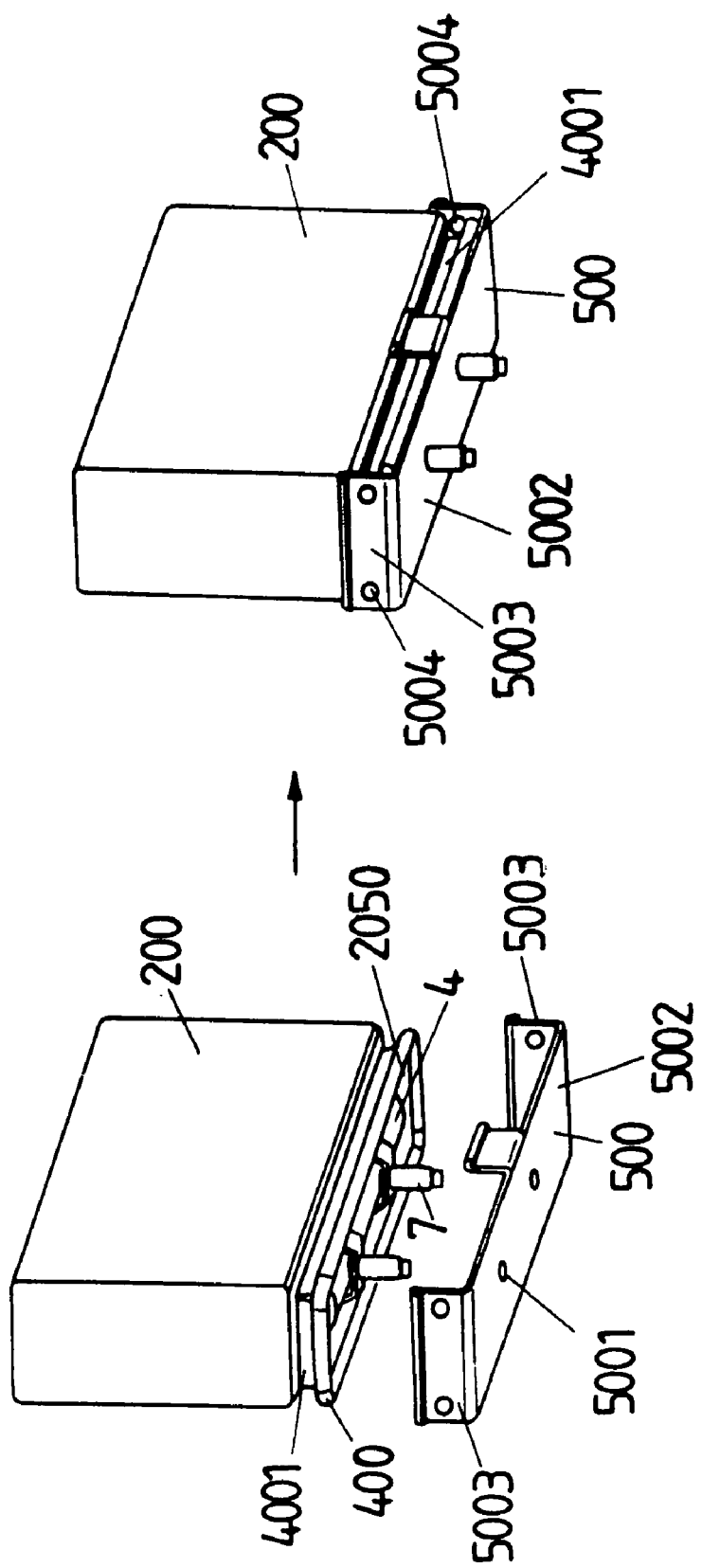

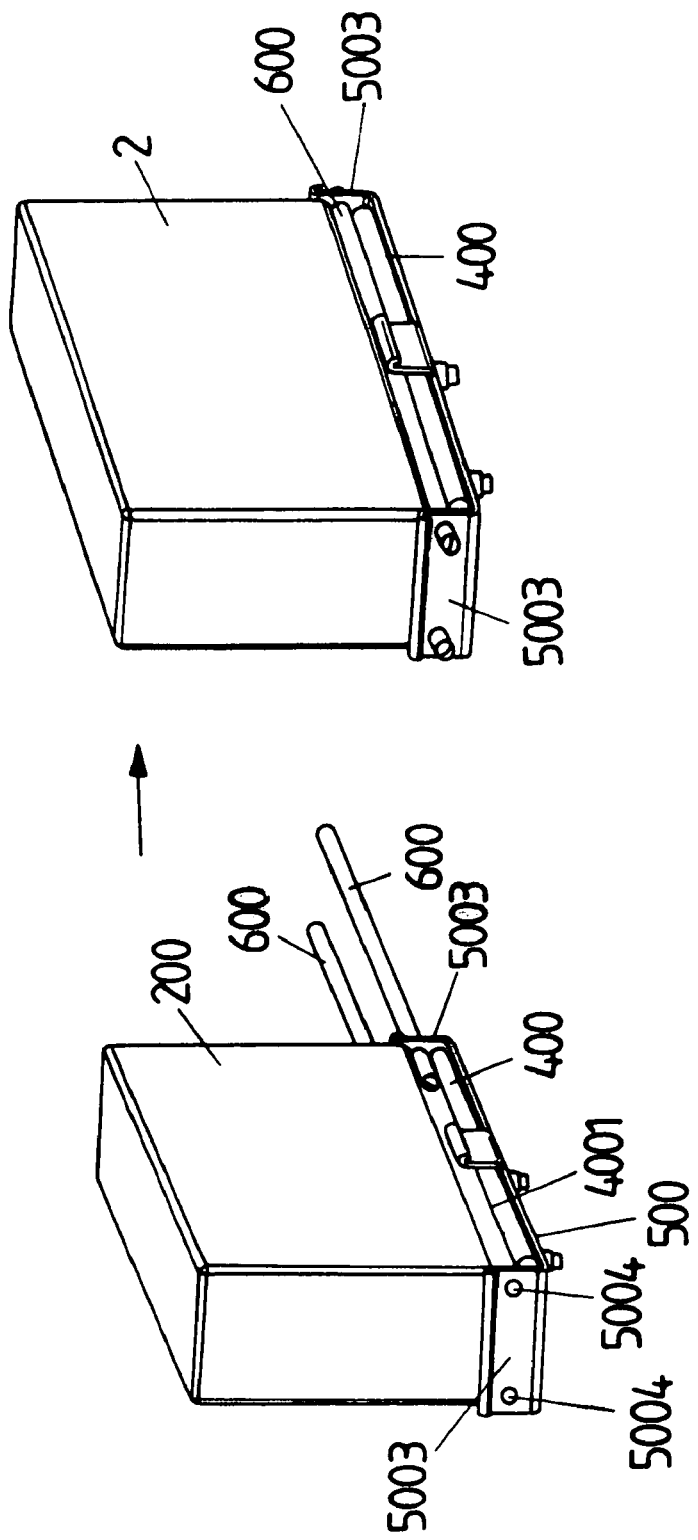

AIRBAG ARRANGEMENT FOR A VEHICLE OCCUPANT RESTRAINT SYSTEM

CROSS-REFERENCE TO RELATED PATENT APPLICATIONS

This application is a Continuation of International Patent Application PCT/EP2008/052857, filed on Mar. 11, 2008, which was published in German on Sep. 18, 2008 as WO 2008/110549 A1. The foregoing International Application is incorporated herein by reference in its entirety.

BACKGROUND

The invention relates to airbag arrangements for a vehicle occupant restraint system.

It is known to fold an airbag of a vehicle occupant restraint system to an airbag package and to pack it in a tightly heat sealed, evacuated film (vacuum packaging). This is described for instance in DE 10 2004 056 128 A1.

A difficulty of the vacuum packaging of an airbag is that a gas generator for inflating the airbag has to be arranged on the airbag. For this purpose openings in airbag and film are required which affect the leak tightness of the heat sealed airbag package. For instance the airbag and the film enclosing the airbag have an opening through which the gas generator reaches into the airbag.

The gas generator can also be predominately arranged inside of the airbag whereat however an ignition cable of the gas generator has to be guided through the airbag and the film to the outside. Furthermore, the gas generator inserted into the airbag is fixed to a mounting structure of the vehicle car body by means of stud bolts which are for instance welded or fixed with clamps to the gas generator whereby the stud bolts have also to be lead out of the airbag and the film.

SUMMARY

The problem to be solved by the present invention is to affect the leak tightness of a cover of an airbag package at little as possible during connecting the closed airbag package with a gas generator.

According to a first exemplary aspect of the invention an airbag arrangement for a vehicle occupant restraint system is specified with
 an airbag folded into an airbag package;
 a cover that may be evacuated and encloses the airbag package;
 a gas generator for inflating the airbag;
 a receptacle in which the gas generator is housed with at least one section, whereby
 the receptacle is formed by a section of the cover enclosing the airbag package, and
 the airbag comprises an opening, in which the receptacle is arranged at least sectionally or into which the receptacle projects.

In this airbag arrangement the gas generator is not directly arranged in an opening of the airbag but in a receptacle formed by (gas-tight) cover that may be evacuated. The receptacle is for instance arranged in the opening of the airbag in such a manner that the opening is closed by the receptacle. By this through openings in the cover for arranging the gas generator are avoided; the cover may be evacuated, so that the airbag can be vacuum packed in said cover.

An "opening" can be for instance a (spatial) receiving structure (for instance tubular formed). Such a receiving structure can for instance comprise an access to the inflatable area of the airbag. An opening can also be a (two-dimensional) recess (a hole) in the airbag or in the airbag material.

In a further exemplary improvement of the invention the receptacle formed by the cover is shaped in such a manner that it uncovers the opening of the airbag at least partially through the exposure of gas which is emitted from the gas generator. In particular the receptacle can be formed by a material (for instance plastic in the form of a film) which is ruptured at least partially by gas which is emitted from the gas generator (for instance due to the temperature effect of the emitted hot gases).

Furthermore, the opening of the airbag in which the receptacle is arranged can have an area sticking out from the airbag and in which the receptacle formed by the cover is extended into. The area sticking out from the airbag can be formed for instance hollow cylindrical, in particular tubular or pipe-like. It is to be mentioned that this is only one variant; it is also possible—as mentioned above—that for instance a flat, hole-type opening in the airbag (for instance in an airbag layer forming an airbag chamber) is provided into which the receptacle formed by the cover extends together with the gas generator.

The area of the opening sticking out of the airbag is exemplary fixed to the gas generator for instance by a clamp connection (for instance by a clamp). Furthermore, the extending area can have a first section and a second section which extends angular to the first section. Hereby the opening of the airbag can have for instance a hollow cylindrical socket which for example leads rectangular into a further for instance also hollow-cylindrically formed area. There are however multiple possibilities to form the area of the opening sticking out from the airbag. The extending area is in particular formed in such a manner that it facilitates a fixation of the receptacle formed by the cover and of the gas generator arranged in the receptacle whereby the gas generator is in particular formed as a tubular gas generator.

In a further exemplary embodiment of the invention the cover has a first part and a second part whereby the first part is connected to the second part basically gas-tight. The bonding of both parts is carried out for instance by welding or gluing.

In the first part, on the one hand, an airbag package receptacle in which the airbag package is housed and on the other hand the receptacle for the gas generator can be formed. As material for the two parts in particular plastics are considered in which by deep-drawing a cavity for forming the airbag package receptacle and the receptacle for the gas generator is created.

In an exemplary embodiment of the invention the receptacle for the gas generator is formed in the cavity (of the first and/or the second part) by turning inwards into the cavity a cavity extension branching off from the cavity.

Furthermore, the cover is exemplary formed flexible and it is evacuated for compressing the airbag package so that insight of the cover a low pressure exists.

According to a second exemplary aspect of the invention an airbag arrangement for a vehicle occupant restraint system is provided with
 an airbag folded into an airbag package;
 a cover that may be evacuated and encloses the airbag package;
 a gas generator for inflating the airbag, whereby
 the airbag package has at least one section which extends along at least one segment of the outer periphery of the gas generator around the gas generator and a segment of the cover continues between the gas generator and the section of the airbag package extending around the gas generator, For instance the section of the airbag package extending along the outer periphery of the gas generator is placed around the gas generator fitting to the gas generator. "Fitting" here means that the section follows the shape of the gas generator but is not necessarily in contact with the gas generator. The connection of the gas generator with the airbag package is effected in such a manner that at least one section of the airbag package is placed around the gas generator. Here, as a matter of cause, the section does not have to encompass the complete outer periphery of the gas generator but can also be placed only sectionally around the gas generator.

According to an exemplary embodiment of the invention a segment of the cover continues between the gas generator and the section of the airbag package extending around the gas generator. In particular, this segment of the cover blocks an inflow port or multiple inflow ports of the airbag. Preferably the segment is formed in such a manner that it unblocks the inflow port at least partly by the impact of gas streaming out of the gas generator after igniting the gas generator.

In a further exemplary improvement of the invention according to the second aspect of the invention the gas generator is arranged in respect to one inflow port of the airbag in such a manner that gas flowing out of the gas generator can flow into the airbag through the inflow port. Preferably the section of the airbag package extending around the outer periphery of the gas generator is arranged in the area of the inflow port. For instance two sections of the airbag package extend around the gas generator in opposite directions.

This can but does not have to mean that the section arranged in the area of the inflow port is the only section which is placed around the gas generator but for instance also one or more further sections can be provided which are additionally placed around the gas generator in a spaced manner to the inflow port.

Furthermore, the airbag package can have a subarea (main area) from which the section extending along an outer periphery of the gas generator extends flap-like. The airbag is folded for instance in the area of an airbag chamber in a compressed manner and the section which is placed around the gas generator extends from this folded area.

A further exemplary embodiment of the airbag arrangement according to the second aspect of the invention provides that the section of the airbag package extending along the outer periphery of the gas generator comprises a segment of at least one airbag layer. The section can comprise for instance a segment of a first airbag layer and a segment of a second airbag layer. It is of an advantage if the first and the second layer are placed around the gas generator in opposite directions. Additionally, the first and/or the second layer can have a re-enforcing layer which is at least sectionally (together with the first and/or the second layer) placed around the gas generator as well.

It is furthermore envisaged that the cover encloses the section of the airbag package extending along the gas generator on both of its sides (e.g. on both of its surfaces). In particular the cover continues along a first side and a second side facing away from the first side of the section whereby the cover can for instance rest against the first and the second side. In this embodiment the section of the airbag package is enclosed by a segment of the cover in such a manner that the segment of the cover is also placed around the gas generator. The section of the airbag package placed around the gas generator is also sandwich-like surrounded by the segment of the cover on both of its sides enabling the connection between airbag package and gas generator without requiring openings through the gas-tight cover.

A further exemplary embodiment of the invention according to the second aspect of the invention provides that the cover comprises at least a first and a second part which are being basically gas-tight connected to each other. Here, the first part can have a receptacle in which the airbag package is housed and a rim section protruding from the receptacle.

For instance the rim section can continue along a first side of the section of the airbag package extending around the gas generator. Furthermore, the second part can have a corresponding section (for instance also a rim section) which extends along a second side of the section of the airbag package placed around the gas generator whereby the second side faces away from the first side. In this embodiment one side of the section placed around the gas generator is therefore covered by a section of the first part whereas a second side is covered by a section of the second part. The parts have each a rim sticking out over the section placed around (or to be placed around) the gas generator at which both parts can be connected to each other.

The section extending around the gas generator can furthermore be fixed to the gas generator. For this purpose for instance securing means are provided which can comprise for instance a retaining member which interacts with a retaining structure arranged to the gas generator in such a manner that a loosening (unwinding) of the section of the airbag package extending along the outer periphery of the gas generator is counteracted. The retaining element can be for instance a cylindrical element (for instance a wire) which is arranged in a loop of the section of the airbag package extending around the gas generator. The loop can hereby be formed by an airbag layer of the airbag so that the retaining element is sewed to the airbag layer. The retaining element is made for instance of plastic or metal.

The retaining structure interacting with the retaining element can be formed at the gas generator itself or for instance at a carrier connected to the gas generator. For instance a rail-type structure can be arranged on one carrier whereby the structure overlaps the longitudinal retaining elements which are formed on the section extending around the gas generator and thus fix the section on the gas generator.

It is pointed out that under the term "gas generator" also an arrangement of a gas generator (e.g. a chamber with a pyrotechnical unit) and a diffuser for diffusing a gas stream emitting from the gas generator chamber is to be understood. In particular, the gas generator can comprise a tubular gas generator with an axially arranged diffuser.

In a further exemplary variant the mounting elements formed at the section which is placed around the gas generator comprise openings through which bolt-type mounting elements arranged at the gas generator (i.e. for instance also arranged at a carrier connected to the gas generator) reach through.

In a third exemplary aspect of the invention an airbag arrangement for a vehicle occupant restraint system is provided with
  an airbag folded into an airbag package;
  a cover that may be evacuated and encloses the airbag package;
  a carrier to which the airbag package is fixed to whereby the airbag package has a mounting structure, and
  at least one bolt-type mounting structure is arranged at the carrier which engages behind the mounting structure of the airbag package.

The mounting structure can be arranged for instance at a loop of an airbag layer of the airbag. In particular the carrier can have at least one guiding structure in which the bolt-type mounting element can be guided and shifted for fixing and also for loosening the airbag package at the carrier. For instance the guiding structure has two rail-type elements opposed to each other. Accordingly the bolt type mounting element can have two arms opposed to each other which engage into the rail-type elements and are guided in those.

In further exemplary variant the carrier has two openings opposed to each other through which the bolt-type mounting element reaches trough. Here, the bolt-type mounting element is provided for instance in form of a longitudinal, cylindrical element which extends along for instance an also longitudinal retaining structure on the airbag package and reaches through it and thereby is fixed at the carrier. The longitudinal mounting element is fixed at the carrier by the fact that each of its opposing ends reaches through one of the two openings opposed to each other and spaced apart from each other. The ends are preferably occupied at the openings so that the mounting element cannot slip out of the openings.

BRIEF DESCRIPTION OF THE DRAWINGS

The invention is explained in the following description of examples on the basis of the Figures.

FIG. 5 shows a variant of a cover for an airbag package.

FIG. 6 shows a variant of a cover for an airbag package.

FIG. 7B shows a third variant of a cover for an airbag package.

FIG. 7C shows a third variant of a cover for an airbag package.

FIG. 8A shows a variant of an airbag arrangement according to the second aspect of the invention.

FIG. 8B shows a variant of an airbag arrangement according to the second aspect of the invention.

FIG. 10A shows a variant of an airbag arrangement according to the second aspect of the invention.

FIG. 10B shows a variant of an airbag arrangement according to the second aspect of the invention.

FIG. 10C shows a variant of an airbag arrangement according to the second aspect of the invention.

FIG. 11A shows a further variant of an airbag arrangement according to the second aspect of the invention.

FIG. 12A shows a third variant of an airbag arrangement according to the second aspect of the invention.

FIG. 12C shows a third variant of an airbag arrangement according to the second aspect of the invention.

FIG. 14A shows a variant of an airbag arrangement according to the third aspect of the invention.

FIG. 14B shows a variant of an airbag arrangement according to the third aspect of the invention.

FIG. 14C shows a variant of an airbag arrangement according to the third aspect of the invention.

FIG. 14D shows a variant of an airbag arrangement according to the third aspect of the invention.

FIG. 14E shows a variant of an airbag arrangement according to the third aspect of the invention.

FIG. 14F shows a variant of an airbag arrangement according to the third aspect of the invention.

FIG. 14G shows a variant of an airbag arrangement according to the third aspect of the invention.

FIG. 15A shows a second variant of an airbag arrangement according to the third aspect of the invention.

FIG. 15B shows a second variant of an airbag arrangement according to the third aspect of the invention.

DETAILED DESCRIPTION

Figure 1:
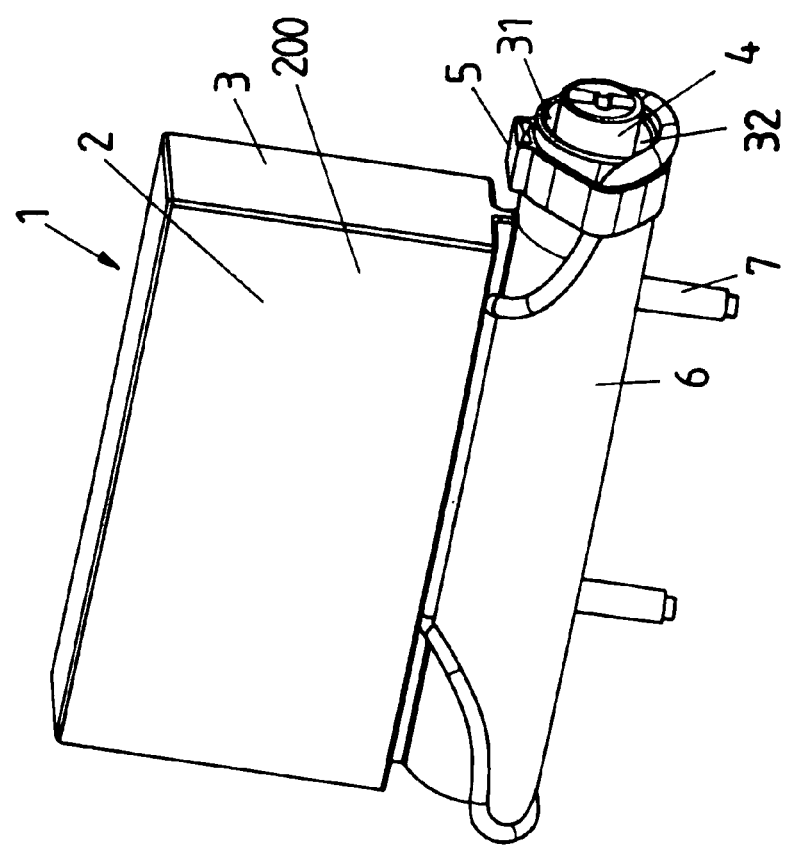
FIG. 1 shows a first variant of an airbag arrangement according to the first aspect of the invention.

FIG. 1 shows a first embodiment of an airbag arrangement according to the first aspect of the invention. An airbag arrangement 1 has an airbag 2 folded into an airbag package 200 whereby the airbag is surrounded by a gas-tight sealed cover 3. Furthermore, a tubular gas generator 4 is provided which serves for inflating the airbag 2 and which is housed in a hollow cylindrical receptacle 31 which is formed by a section of the cover 3. The receptacle 31 is in turn arranged in a hollow cylindrical shaped area 32 of an opening 23 of the airbag 2.

The gas generator 4 is connected to the hollow cylindrical area 32 and to the receptacle 31 by a clamp 5. Simultaneously a holder 6 is fixed to the gas generator via the clamp 5. The holder 6 has stud bolts 7 for fixing the holder 6 (and thus of the gas generator 4) to a vehicle body or to a part connected to the vehicle body.

Figure 2:
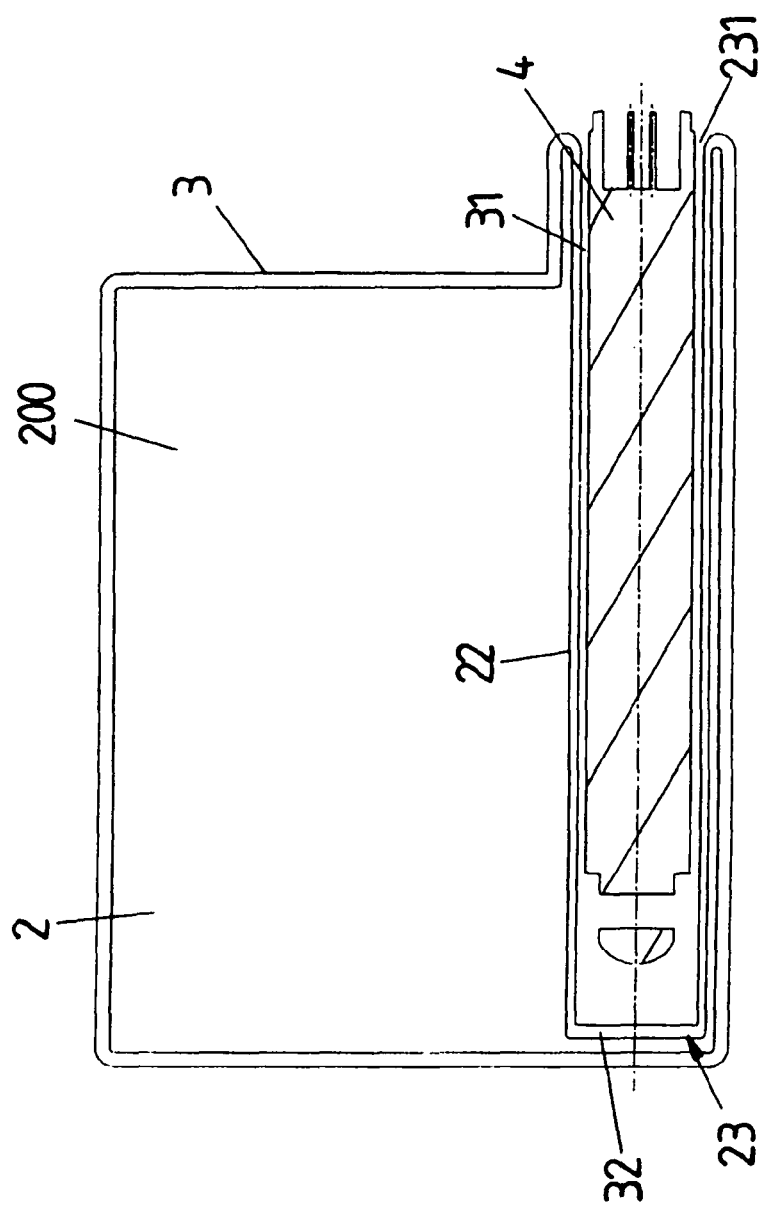
FIG. 2 shows a schematic cross section of an airbag arrangement according to the first aspect of the invention.

FIG. 2 shows a variant of an airbag arrangement in cross section which corresponds basically to the arrangement of FIG. 1. An airbag package 200 formed by a folded airbag 2 is basically enclosed by an evacuated cover 3. Cover 3 forms a receptacle 31 which is arranged in a hollow cylindrical area 32 of an opening 23 of the airbag 2. The hollow cylindrical area 32 has an end 231 through which the receptacle 31 together with a gas generator arranged in the same can be inserted into the hollow cylindrical area 32. A further section 22 of the hollow cylindrical area opens out into a chamber of the airbag 2.

The receptacle 31 is arranged in the hollow cylindrical area 32 and designed gas-tight in such a manner that it blocks the opening 23 of the airbag and therefore prevents in particular an inflow of air and an impairment of the vacuum present in cover 3 before inflating the airbag. Only by the impact of gas which flows out of the gas generator against the receptacle 31, it releases the opening 23 so that gas can flow from the gas generator 4 into the airbag. In particular ruptures (for instance made of a plastic film) by the effect of inflowing gas.

The longitudinal axis of the tubular gas generator 4 extends along the hollow cylindrically formed section 32 and the also hollow cylindrical formed receptacle 31. For instance the receptacle 31 and the hollow cylindrical section 32 are arranged in a coaxial manner to the gas generator 4.

Figure 3:
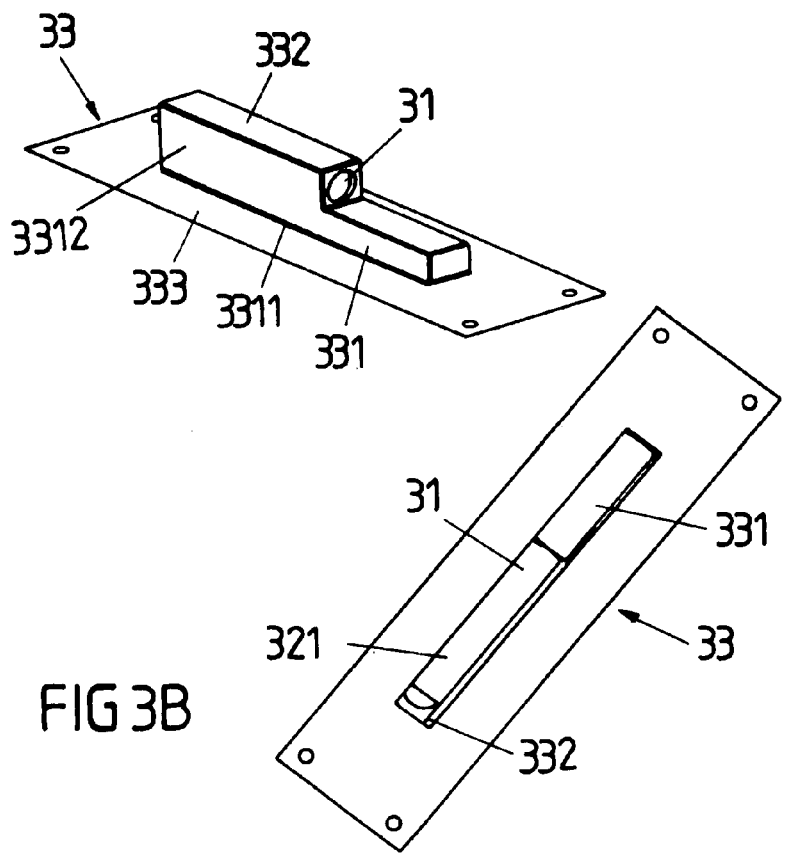
FIG. 3A shows a variant of a cover for an airbag package according to the first aspect of the invention.
FIG. 3B shows a variant of a cover for an airbag package according to the first aspect of the invention.

FIGS. 3a and 3b show different views of part 33 of a cover for an airbag package (not shown) whereby FIG. 3a shows part 34 diagonally from the top and FIG. 3b shows part 33 from below. Part 33 is made of a deep drawn plastic film in which a first cavity 331 for housing the airbag package and a receptacle 31 for housing a gas generator (not shown) is formed. The receptacle 31 is arranged in a second cavity 332 following the cavity 331.

As can be particularly seen in FIG. 3b the receptacle 31 is basically formed tubular (snorkel-like) and projects into the cavity 332. An airbag folded into an airbag package is arranged in the cavities 331, 332 in such a manner that the tubular receptacle 31 projects into an opening of the airbag, whereby the opening of the airbag is sealed by the receptacle.

Part 33 has a rim section surrounding the two cavities 331, 332 which almost angularly sticks out from a rim 3311 which restricts a side wall 3312 common to both cavities 331, 332. The rim section 333 is connected (after inserting the airbag package) with a second part (not shown) in a gas-tight manner whereby a closed cover is formed. The second part to be connected with the first part 33 is preferably shaped plate-like and is connected with the first part 33 for instance firmly bonded (for instance by welding).

Figure 4:
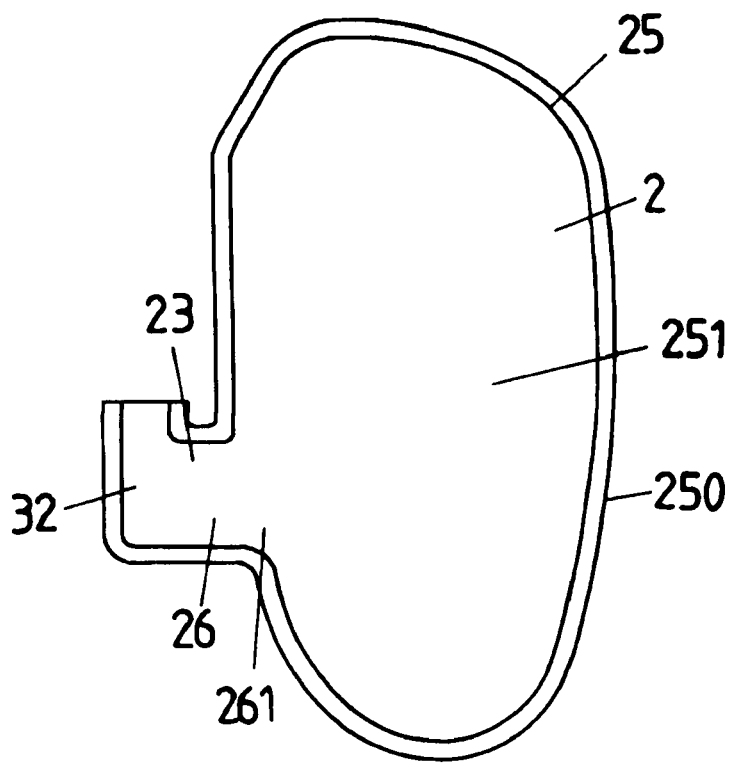
FIG. 4 shows a variant of an airbag in an unfolded status according to the first aspect of the invention.

FIG. 4 shows an airbag 2 for an airbag arrangement according to the first aspect of the invention in an unfolded status. The airbag 2 has two airbag layers which are connected along their outer periphery 250 (along the airbag) by a circumferential seam 25. Thus, an inflatable chamber 251 is formed between the airbag layers. It is to be understood that also more than two airbag layers can be applied. For instance each of the two layers can be provided at least sectionally with a re-enforcing layer.

Airbag 2 has an opening 23 which comprises the section 27 which sticks out from the airbag 2. Area 27 in turn has a first section in form of a socket 26 which ends with a first end in a second section in form of a hollow cylindrical area 32 and a second end in an inflow opening 261. The hollow cylindrical area 32 extends almost angularly to the socket 26.

Airbag 2 can be folded to an airbag package and be enclosed by a (basically gas-tight) cover that may be evacuated. The hollow cylindrical area 32 is formed in such a manner that a receptacle formed by the cover and a gas generator arranged in the receptacle can be housed. In this case the flow inlet from the gas generator to chamber 251 of the airbag 2 is blocked by the receptacle before triggering the gas generator.

FIG. 5 shows a variant for the production of an (gas-tight) cover which may be evacuated for blocking an airbag package. A first part 33 has a cavity section 334 which is for instance made by deep drawing of a plastic film. The cavity section 334 comprises a first cavity 335 from which a cavity extension 336 extends.

The cavity section 334 is restricted by a side wall 3341 from which a basically flat rim section 3342 sticks out in an angular manner. The rim section 3342 is also being connected in a gas-tight manner (for instance firmly bonded) to a second part 34 which also extends basically in a planar manner. For creating a receptacle for a gas generator the cavity extension 336 is pressed (turned inward) into the first cavity 335 (before or after the two parts 33, 34 are connected). By this the receptacle is formed in the first cavity. The length of the cavity 336 extensioning along the impressing direction can be larger than the dimension the first cavity 335 in this direction so that the receptacle formed by the turned-in portion sticks out of the first cavity with a section. A gas generator arranged in the receptacle can for instance be fixed (for instance by a clamp) to the section sticking out.

By turning inward the cavity extension 336 into the cavity 335 a section 331 is created adjacent to the receptacle in which an airbag folded to an airbag package can be inserted. Thereby the airbag package can be positioned in such a manner that the receptacle formed by turning inward is arranged in an opening of the airbag, for instance projects into the opening.

FIG. 6 shows a variant of a cover 3 for an airbag package resembling the cover according to FIG. 5. A first part 33 is connected with a second part 34 whereby a cavity 335 is formed in the first part 33. The connection of parts 33, 34 is done by welding, whereby a weld seam 35 encloses the cavity 335 and defines simultaneously a cavity between the first part 33 and the second part 34 with a section 351, which follows the cavity 335. The cavity 336 defined by the section 351 of the weld seam 35 corresponds to the cavity extension of FIG. 5. As described in accordance to FIG. 5 for instance the cavity extension 336 is turned inward into the cavity 335 after or before arranging an airbag package in cavity 335 whereby a receptacle for the gas generator (not shown) is formed.

Figure 7A:
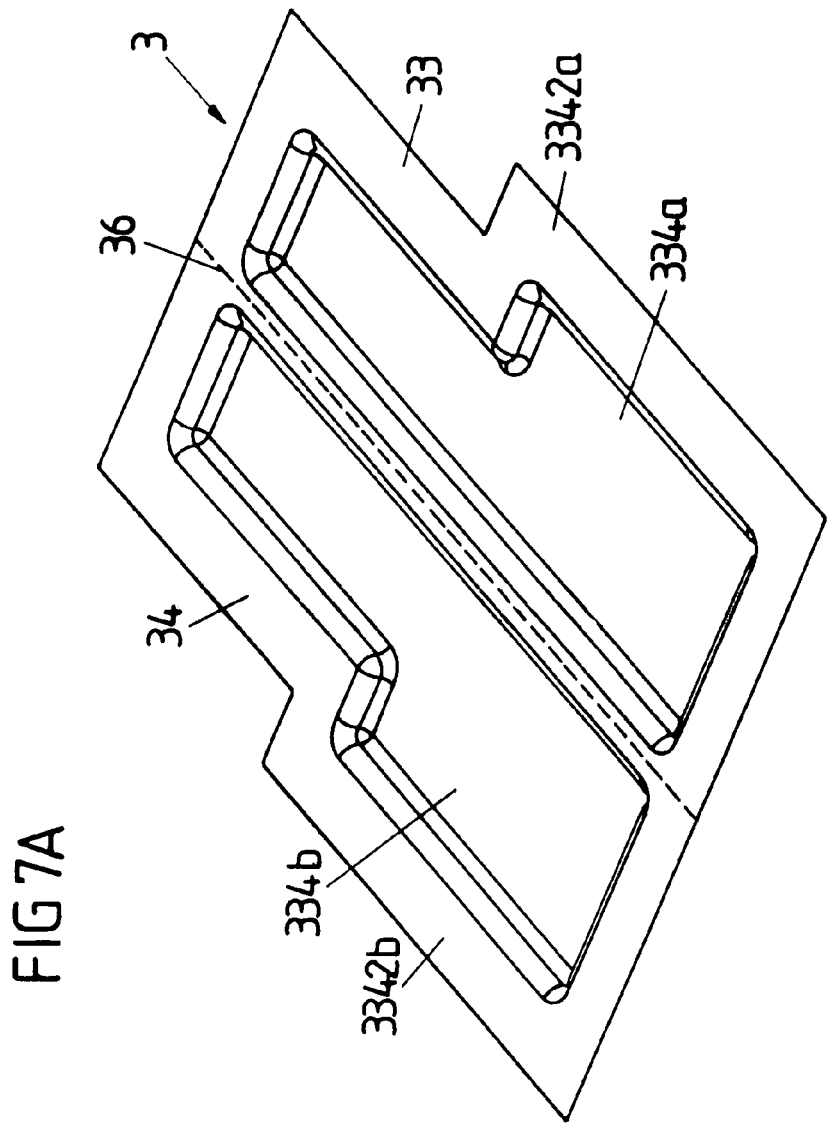
FIG. 7A shows a third variant of a cover for an airbag package.

A further variant of a cover for an airbag package is shown in FIGS. 7a to 7c. A cover 3 has a first part 33 and a second part 34 which are integrally connected to each other along the folding edge 36. Both parts 33, 34 have a cavity 334a, 334b, respectively, whereby the cavities 334a, 334b are each surrounded by a rim section 3342a, 3342b. The rim sections 3342a, 3342b are folded onto each other by folding along the folding edge 36 and are connected to each other (for instance firmly bonded).

Through this, a cover 3 is formed (see FIG. 7b) which has a cavity 334 which is surrounded in centre (related to the height of the cavity 334) by a rim section 3342. Cavity 334 has a cavity extension 336 like the variants of FIGS. 5 and 6 which has to be turned inward into a cavity section 335 in order to form a receptacle for a gas generator. FIG. 7c shows a side view of the folded cover 3 of FIG. 7b.

FIGS. 8 to 11 relate to embodiments according to the second aspect of the invention. FIG. 8a shows (schematically) an airbag 2 folded into an airbag package 200, whereby the airbag package 200 should be gas-tightly enclosed by a cover. The cover consists of a first part 33 which has a receptacle 331 for housing the airbag package 200 whereby the receptacle is designed as a cavity. Furthermore the cover features a second part 34 which is gas-tightly connected to the first part 33 after the airbag package 200 was arranged in the receptacle 331.

The first part 33 has a rim section 333 surrounding the cavity 331 which can be connected to a correspondingly designed rim section 343 of the second part 34. The first and the second part 33, 34 as well as the airbag package 200 have also on one side a curved recess 337, 347 or 207, respectively, which serves the reception of a tubular gas generator (not shown).

The airbag package 200 has a main section 2090 (shown cuboid-like) which has an inflow opening (not shown) of the airbag 2 on one of its longitudinal sides 2071 through which gas from a gas generator can flow into the airbag. The inflow opening is delimited by a first and a second airbag layer of the airbag whereby segments 201, 202 of the airbag layers stick out from the main section 2090 of the airbag package 200.

The rim section 333 of the first part 33 continues along a first (in FIG. 8b upper) side 291 of the respective first and second segments 201, 202 of the airbag package 200 in the sealed airbag package (compare FIG. 8b). The rim section 343 of the second part 34 on the other hand continues along a second (lower) side 292 of the rim sections 201, 202 which faces away from the first side 291. Therefore, the segments 201, 202 of the airbag package 200 extend sandwich-like between the first part 33 and the second part 34.

For fixing the airbag package 200 surrounded by the cover 3 to a gas generator a rim 3002 formed by the segments 201, 202 of the airbag package 200 and the rim sections 333, 334 of the cover 3 is placed around a tubular gas generator. This is explained in more detail on the basis of the following FIGS.

Figure 9A:
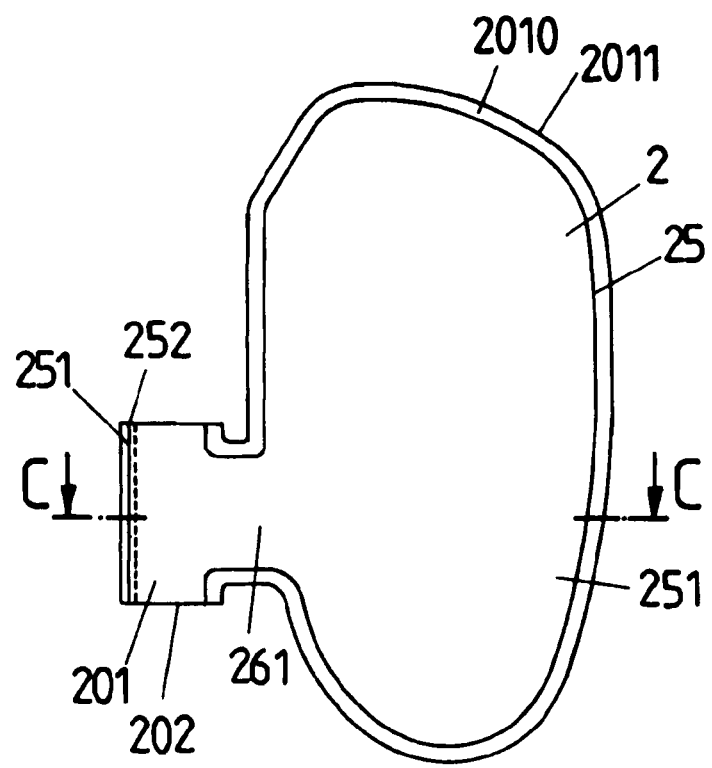
FIG. 9A shows a variant of an airbag in cross section according to the second aspect of the invention.
Figure 9B:
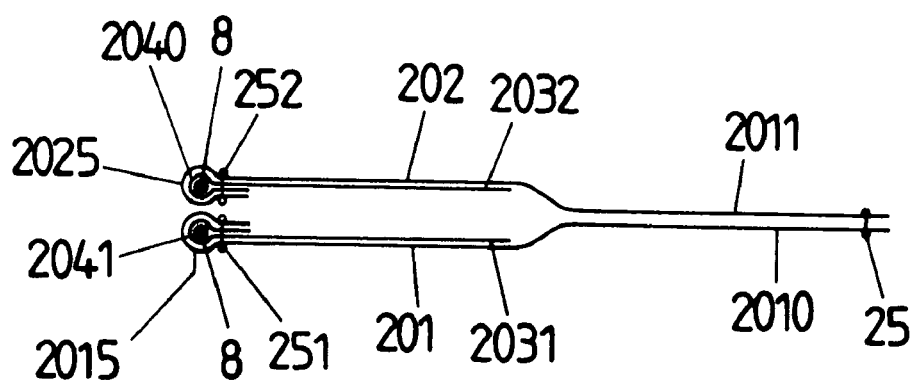
FIG. 9B shows a variant of an airbag in cross section according to the second aspect of the invention.

FIGS. 9a and 9b show schematically a variant of an unfolded airbag 2 in its cross section. According to FIG. 9a the airbag 2 has two airbag layers 2010, 2011 which are connected to each other along a circumferential seam 25 so that an airbag chamber 251 is defined between them. Furthermore, the airbag 2 features in an inflow opening 261 through which gas of a gas generator (in case of a trigger) can flow into the airbag chamber 251. Segments 201, 202 of the airbag layers 2010, 2011 stick out from the inflow opening 261 whereby the segments 201, 202 sticking out are not connected with each other and can therefore be flipped open. Segments 201, 202 are placed around the gas generator in particular in opposite directions in order to connect an airbag package folded from an airbag with the gas generator.

In the area of segments 201, 202 further layers 2031, 2032 (compare FIG. 9b) are arranged whereby the additional layers 2031, 2032 serve as re-enforcing layers and each of the layers 2031, 2032 are connected with the respective segment 201, 202. The re-enforcing layers 2031, 2032 are connected with the segments 201, 202 via seams 251, 252.

As apparent from the cross section of FIG. 9b the re-enforcing layers 2031, 2032 as well as the segments 201, 202 form a loop 2040, 2041 or 2015, 2025, respectively. Hereby the (inner) loops 2040, 2041 formed by the re-enforcing layers 2031, 2032 are each enclosed by the (outer) loops 2015, 2025 formed by the segments 201, 202. Securing means in form of longitudinal retaining elements 8 are arranged in the inner loops 2040, 2041, respectively, whereby the retaining elements can be for instance shaped in form of a wire or a cylindrical rod.

The sections 201, 202 of the airbag layers 2010, 2011 are placed around the gas generator optionally together with the re-enforcing layers 2031, 2032. The retaining elements 8 interact in particular with securing structures (not shown) formed at the gas generator so that a loosening of the sections 201, 202 placed around the gas generator is counteracted.

Sections 201, 202 are preferably enclosed on both sides by a section of the cover after folding the airbag to a airbag package and surrounding the airbag package with a gas tight cover of a section of the cover before it is placed around the tubular gas generator (see FIGS. 8a and 8b). Thereby the section of the cover lies against both sides of the sections 201, 202 in such a manner that it is wrapped around the airbag together with the sections 201, 202.

FIGS. 10a to 10c relate to a further variant of an airbag arrangement according to the second aspect of the invention. An airbag package 200 (folded airbag 2) surrounded by a cover 3 is arranged to a tubular gas generator 4. The airbag package 200 has two segments 201, 202 whereby each is placed along an outer periphery around the tubular gas generator 4 (each by circa ¾ of the outer periphery of the tubular gas generator 4). Each of the segments 201, 202 represent sections of at least one airbag layer which are respectively enclosed by sections 3011 or 3021 of cover 3 on both sides so that a segment of the cover 3 (formed by a segment of sections 3011, 3021) continues between the gas generator 4 and the sections 201, 202. The double sided enclosing of sections 201, 202 is carried out in such a manner that a segment 3011 or 3021 fits to each side of sections 201, 202, respectively. That means that the segments 3011, 3021 of cover 3 extend around the sections 201, 202 of the airbag layers and are located on the side facing the gas generator 4 as well as on the side facing away from the gas generator of sections 201, 202.

The segments 201, 202 are therefore enclosed sandwich-like by the segments 3011, 3021 of cover 3. An alternative for implementing such an enveloping of sections 201, 202 is shown in FIGS. 8a and 8b. The "packaged" sections 201, 202 are placed around the gas generator 4—as shown in the enlarged display of FIG. 10b.

Rod-like retaining elements 8 are arranged in a rim section (on the free ends) of segments 201. 202, respectively, which can interact with securing structures (not shown) of the gas generator.

FIG. 10c shows the tubular gas generator of FIGS. 10a, 10b. The tubular gas generator 4 comprises in the area of a gas outflow opening 41a gas diffuser 410 for diffusing gas flowing out of the gas generator 4. According to FIGS. 10a, 10b the gas generator 4 is wrapped by the segments 201, 202 of the airbag together with its diffuser 410.

Figure 11B:
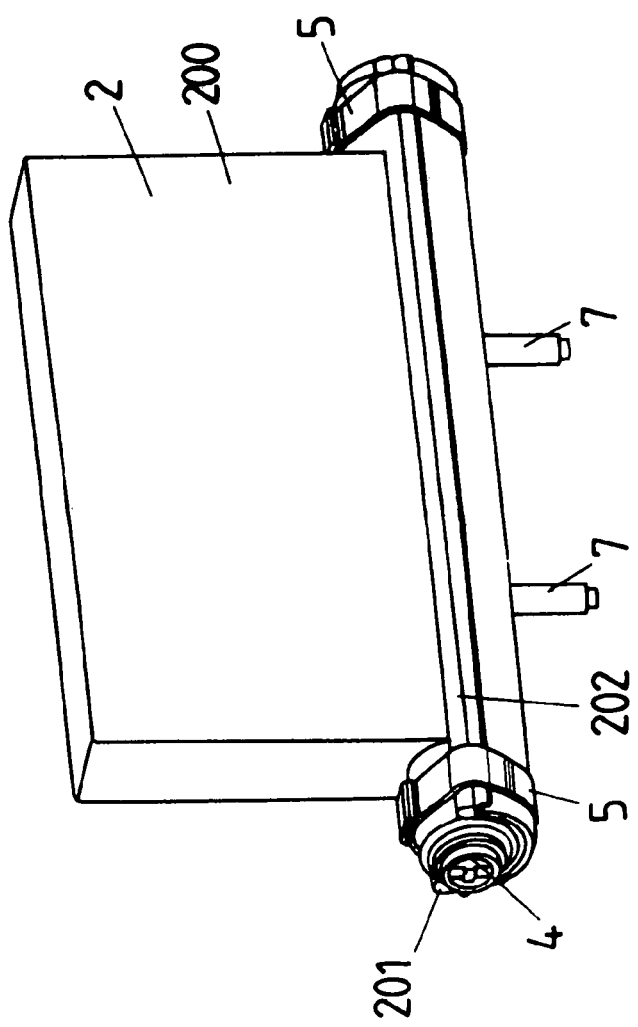
FIG. 11B shows a further variant of an airbag arrangement according to the second aspect of the invention.

FIGS. 11a and 11b show a further variant of an airbag module according to the second aspect of the invention. Here, analogously to the embodiments of FIGS. 10a to 10c an airbag package 200 (folded airbag 2) is connected with a tubular gas generator (which comprises a diffuser 410) in such a manner that flap-like segments 201, 202 of the airbag 2 are placed around the outer periphery of the tubular gas generator 4 or the diffuser 410. Each of the segments 201, 202 have rod-like retaining elements 8 which are arranged along their (free) longitudinal edge and extend along the longitudinal axis of the tubular gas generator after placing the sections 201, 202 around the tubular gas generator 4.

The retaining elements 8 are overlapped by rail-type retaining structures 102 which are arranged on carrier 10 whereby a loosening of the sections 201, 202 placed around the gas generator is counteracted. Segments 201, 202 and the carrier are fixed to the tubular gas generator also by two clamps 5 as fixing means. The carrier 10 also features stud bolts 7 via which the airbag arrangement (gas generator and airbag package) can be fixed to a vehicle part.

The diffuser 410 has outflow openings 4101 through which gas of the gas generator is emitted. The outflow openings 4101 are arranged in relation to an inflow opening (or also multiple inflow openings) of airbag 2 in such a manner that gas of a gas generator can enter into the airbag (into an inflatable chamber of the airbag).

Figure 12B:
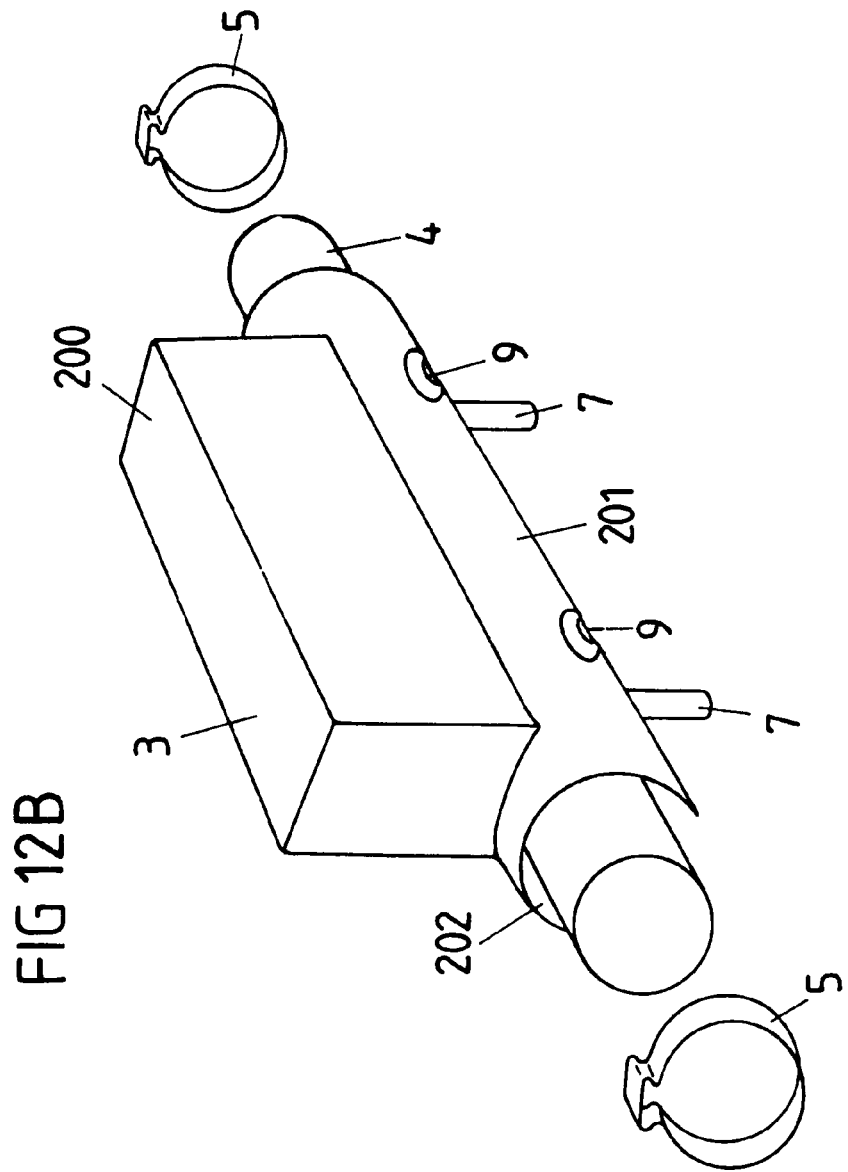
FIG. 12B shows a third variant of an airbag arrangement according to the second aspect of the invention.

FIGS. 12a to 12c refer to a further variant of the second aspect of the invention. An airbag 2 is folded to an airbag package 200, which is gas-tightly enclosed by a cover 3. The airbag package 200 features flap-like sections 201, 202 (which are not folded) which stick out and extend from a main section 2090 of the airbag package 200. Segments 201, 202 exhibit sections of a respective airbag layer of airbag 2 and are in each case enclosed by the segments 3011, 3021 of cover 3. Thereby, the enclosing of segments 201, 202 is carried out in such a manner—as before explained above—that the cover segments 3011, 3021 surround the segments 201, 202 of the airbag package 200 adjacent on both sides, respectively.

Fixing openings 9 are arranged in the segments 201, 202 (and accordingly also in the sections 3011, 3021 of cover 3). The airbag package 200 is arranged in respect to gas generator 4 in such a manner that gas flowing out of the outflow openings 41 of gas generator 4 can flow into the airbag 2 through at least one inflow opening (not shown).

FIG. 12b shows how the wrapped segments 201, 202 are placed around the tubular gas generator 4 in order to connect the airbag package 200 with the gas generator 4. Stud bolts 7 are attached to the gas generator 4 whereby the segments 201, 202 are wrapped around gas generator 4 in such a manner that the stud bolts 7 reach through the fixing openings 9 of the segments 201, 202. It can be taken from FIG. 12c that the segments 201, 202 are fixed to the tubular gas generator 4 by two clamps 5 after being placed around the tubular gas generator 4.

Figure 13:
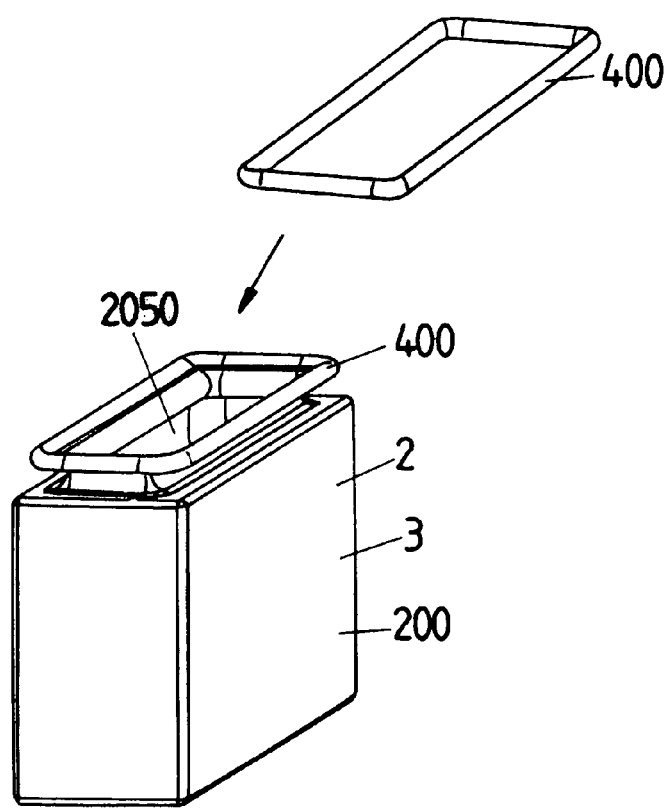
FIG. 13 shows an airbag package according to the third aspect of the invention.

FIGS. 13 to 15 relate to embodiments of an airbag arrangement according to a third aspect of the invention. A first embodiment is shown in FIGS. 13 to 15. FIG. 13 features an airbag package 200 (which is obtained by folding an airbag 2) which is enclosed by a gas-tight cover 3. Airbag package 200 features a fixing structure in form of a frame 400. The frame 400 made for instance of metal or plastics is arranged on a rim section of airbag 2 whereby frame 400 is arranged for instance in a loop of this rim section. The airbag package 200 is shaped in such a manner that it has a central receptacle 2050 which serves the housing of a gas generator, in particular of a tubular gas generator. This is shown in FIGS. 14a to 14e.

The tubular gas generator 4 is fixed to a carrier 10 by clamps 5. The airbag package 200 is placed onto the arrangement of gas generator 4 and carrier 10 in such a manner that gas generator 4 extends into the receptacle 2050 of the airbag package; see FIG. 14b.

Carrier 10 features a recess 101 which holds the frame 400 of airbag package 200. Furthermore, carrier 10 comprises two opposite rail-type guiding elements 102 continuing along its longitudinal direction (and therefore in longitudinal direction of the tubular gas generator 4).

As shown in FIGS. 14c to 14e the two guiding structures 102 serve the purpose to hold a respective bolt-type mounting element 103 at the front ends of carrier 10 opposing each other. The mounting elements 103 have in each case two opposing arms 1031 which can be slid into the guide rails 102 so that the locking element 103 can be moved within the guide rails 102 and along the longitudinal direction of carrier 10.

The U-shaped locking elements 103 are moved in the carrier 10 in such a manner that their arms 1031 engage behind the frame 400 of airbag package 200 and therefore fix the airbag package 200 to carrier 10. FIG. 14d shows the situation of assembly whereby the locking elements 103 are completely slid into the carrier 10. According to FIG. 14e the locking elements 103 themselves are fixed to the carrier 10 by bolt-like fixing elements 104 reaching through fixing openings in the locking elements 103 and in carrier 10.

Figure 14H:
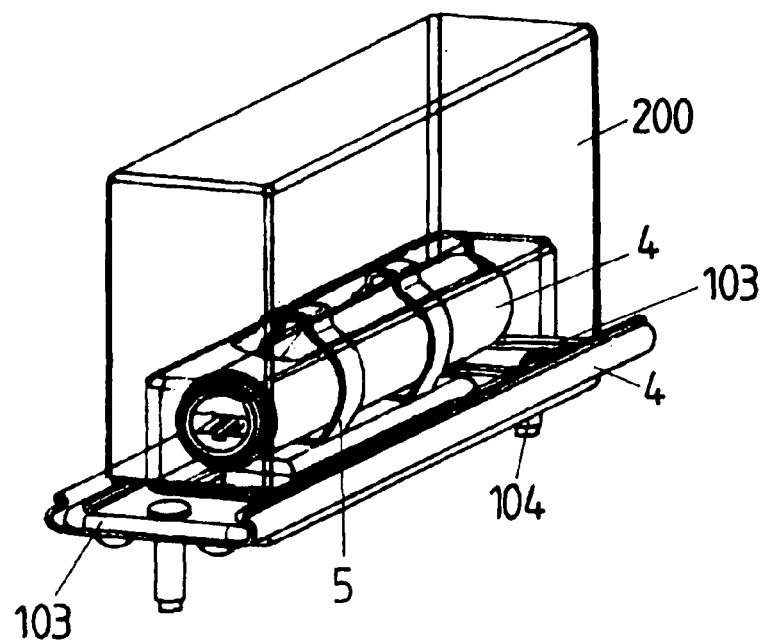
FIG. 14H shows a variant of an airbag arrangement according to the third aspect of the invention.

Further views of the completely assembled airbag arrangement are shown in FIGS. 14f to 14h. FIG. 14g represents a view of the lower side of the assembled airbag arrangement. It arises that clamps 5 connecting the gas generator 4 with carrier 10 feature stud bolts 7 on the side facing away from the gas generator 4 which are fixed to the carrier 10 by screw nuts 71.

A further variant of the airbag arrangement according to the third aspect of the invention is shown in FIGS. 15a and 15b. Similar to FIGS. 14a to 14h a gas generator 4 is arranged in a receptacle 2050 of an airbag package 200. Gas generator 4 has threaded bolts 7 which reach through fixing openings 5001 in a retaining plate (carrier) 500. The retaining plate features a bottom plate 5002 from which two almost parallel opposing front sides 5003 extend.

Similar to FIG. 13 airbag package 200 features a frame 400 on one side which during assembly of airbag package 200 to carrier 500 sets up on its bottom plate 5002. The front sides 5003 of carrier 500 have openings 5004 which in each case align with nuts 4001 of the airbag package 200 extending above the metal frame 400.

As shown in FIG. 15b two rod-like fixing elements 600 are slid into openings 5004 of a first front side of carrier 500 in such a manner that they engage behind longitudinal sections of frame 400 of the airbag package 200 and thus fix the airbag package 200 to the carrier 500. The fixing elements 600 are guided through nuts 4001 in the airbag package which are adjacent to frame 400 and are in each case moved forward so far until they reach through the opening 5004 of a second front side which is opposite of the first front side.

The priority application, German Patent Application 20 2007 003 906.9, filed Mar. 12, 2007, including the specification, drawings, claims and abstract, is incorporated herein by reference in its entirety.

What is claimed is:

1. An airbag arrangement for a vehicle occupant restraint system, comprising:
   an airbag folded into an airbag package;
   a cover that may be evacuated and encloses the airbag package; and
   a gas generator for inflating the airbag,
   wherein a section of the cover forms a receptacle,
   wherein at least one section of the gas generator is housed in the receptacle,
   wherein the airbag comprises an opening, which forms an inlet to an inflatable area of the airbag,
   wherein the gas generator is formed as a tubular gas generator, the tubular gas generator being longer in a direction of a longitudinal axis of the gas generator than in a direction perpendicular to the longitudinal axis of the gas generator,
   wherein the opening has a hollow cylindrical area in which the receptacle is arranged, or the opening is formed as a hole in an airbag layer which forms a chamber of the airbag such that the receptacle projects into the hole of the airbag layer.

2. The airbag arrangement as claimed in claim 1, wherein the receptacle formed by the cover is arranged in the opening of the airbag in such a manner that the opening is closed by the receptacle.

3. The airbag arrangement as claimed in claim 1, wherein the opening of the airbag has an area sticking out from the airbag, and wherein the receptacle formed by the cover extends into the area sticking out from the airbag.

4. The airbag arrangement as claimed in claim 3, wherein the area sticking out from the airbag has a first section and a second section which extends at an angle to the first section.

5. The airbag arrangement as claimed in claim 1, wherein the cover has a cavity for housing the airbag package.

6. The airbag arrangement as claimed in claim 5, wherein in the cavity the receptacle for the gas generator is formed by turning inward into the cavity a cavity extension branching off from the cavity.

7. The airbag arrangement as claimed in claim 1, wherein the receptacle is hollow cylindrically formed.

8. The airbag arrangement as claimed in claim 7, wherein the tubular gas generator, the hollow cylindrical area of the opening and the receptacle are coaxially arranged.

9. A vehicle occupant restraint system with an airbag arrangement as claimed in claim 1.

10. The airbag arrangement as claimed in claim 1, wherein the receptacle is tubular such that the receptacle is longer in a direction of a longitudinal axis of the receptacle than in a direction perpendicular to the longitudinal axis of the receptacle.

11. An airbag arrangement for a vehicle occupant restraint system, comprising:
- an airbag folded into an airbag package;
- a cover that may be evacuated and encloses the airbag package; and
- a gas generator for inflating the airbag,
- wherein a section of the cover forms a receptacle,
- wherein at least one section of the gas generator is housed in the receptacle,
- wherein the airbag comprises an opening, which forms an inlet to an inflatable area of the airbag,
- wherein the gas generator is formed as a tubular gas generator,
- wherein the opening has a hollow cylindrical area in which the receptacle is arranged,
- wherein the opening of the airbag has an area sticking out from the airbag, and
- wherein the receptacle formed by the cover extends into the area sticking out from the airbag.

12. The airbag arrangement as claimed in claim 11, wherein the area sticking out from the airbag has a first section and a second section which extends at an angle to the first section.

* * * * *